Figure 1:
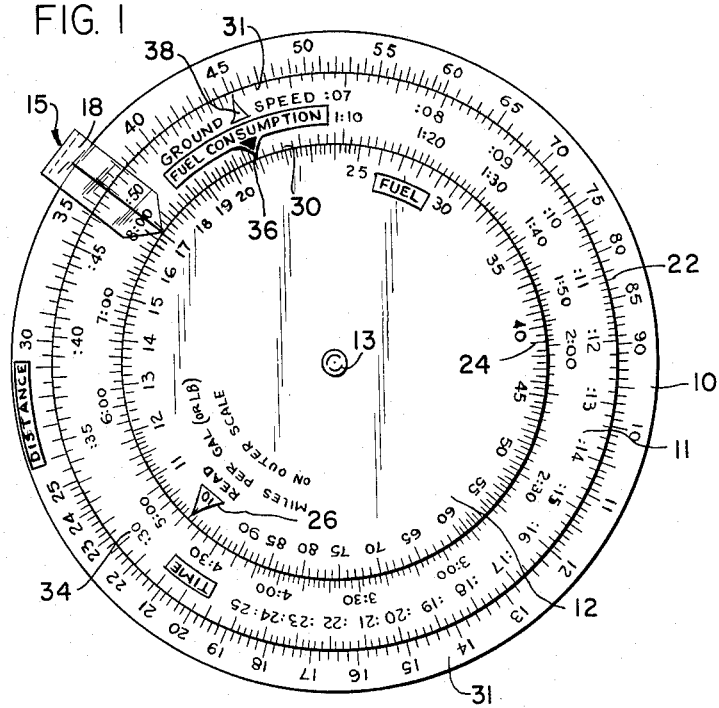

June 14, 1966   J. R. CUMBERPATCH   3,255,961
NAVIGATIONAL AID
Filed Sept. 2, 1964

INVENTOR
J. R. CUMBERPATCH

BY
ATTORNEYS

United States Patent Office 3,255,961
Patented June 14, 1966

3,255,961
NAVIGATIONAL AID
James R. Cumberpatch, 4510 Traymore St.,
Bethesda, Md.
Filed Sept. 2, 1964, Ser. No. 393,906
4 Claims. (Cl. 235—78)

This invention relates to navigational aids and more particularly to three disk computers used for the determination of unknown variables during navigation of aircraft, ships and other vehicles.

In navigation, particularly aerial navigation, it is desirable and necessary to frequently determine certain variables such as distance covered and remaining, past and anticipated speed, and fuel used and remaining.

The planning and execution of long range flights in high performance aircraft are complex problems. Elements contributing to the complexity are the intricate instrumentation of modern aircraft, the high speed and high rate of fuel consumption of jets, and the necessity for near perfection in execution.

In the aerial navigation of high performance aircraft, pilots must keep constantly informed concerning their fuel consumption, distance which can be flown on the remaining fuel, speed, estimated arrival time at points, and the like. Calculations to determine these must be made while in flight. In recent years this has become more difficult due to the multiplicity of time consuming duties of flying the aircraft and the increasing speed of aircraft.

Aerial calculations in the past have been performed in various ways such as tedious mathematical computations and use of two disk circular slide rules. One of the problems encountered in the latter is when determining two or more unknown factors, separate computations had to be made for each unknown, thus increasing the calculating time and possibility of human error.

During pre-flight planning the pilot computes information such as the distance between points and a rough estimate of the time and fuel required to travel therebetween.

In flight the pilot knows or can quickly determine the following known data: (1) The distance between check points; (2) flight time elapsed; (3) fuel consumed; (4) the distance from the last to the next check point; (5) distance from the present position to the destination and (6) the fuel presently aboard the aircraft.

From this known data the pilot must determine the following unknown information: (A) Time required to reach next check point; (B) time to reach destination; (C) fuel required to reach destination; (D) total distance that can be flown from present position; (E) ground speed; (F) fuel consumption; and (G) miles per fuel unit, e.g., miles per gallon.

The information described should be determined at least once between each pair of check points along a route and sometimes oftener, particularly if there is a change in the original flight plan, such as may result from a detour to avoid adverse conditions such as weather or from instructions received from higher authority. Such information is necessary for the pilot to compare his present situation with the flight plan and to determine which of the possible routes, destinations and operational procedures to select, and to notify control personnel of his plans.

Heretofore, the most advanced calculating methods have involved the use of a two-disk circular slide rule. However, such slide rule has required the aviator to arrange the relative positions of the disks separately to make each computation and this has required considerable time and been fraught with the possibility of human error.

The applicant, a senior officer with the United States Air Force, has found that for a group of pilots an average of 3.35 minutes has been required to calculate the seven unknowns to which reference has been made, using the conventional two-disk circular slide rule. In comparison, applicant has found that the same calculations may be made in less than one minute using the three-disk computer of the present invention. Furthermore, the previous two-disk calculation procedures have been relatively difficult for aviators to learn, remember and practice, whereas the procedure with applicant's invention is relatively much easier to learn, remember and practice. Due to the greatly reduced number of steps required in operating applicant's invention, the likelihood of error is substantially less than that accompanying previous calculators.

With the present day speed of jet aircraft, the time between check points has been reduced considerably from that with piston type aircraft. Hence, whereas with previous aircraft the time between check points might approximate an hour, more or less, this has been reduced with high performance aircraft to a mere fraction thereof in many instances.

Coupled with the higher speed and shorter time between check points is the increased complexity of such high performance aircraft. Such aircraft includes various controls, indicators, and instruments not used on earlier aircraft and which demand the attention of the pilot. Thus, the pilot is under considerable pressure from the necessity of flying his aircraft as well as constantly monitoring and checking his instruments and controls and maintaining necessary communication along the route. Such pressure is greatly increased under adverse conditions such as bad weather which requires fuller attention to the mechanics of flying the aircraft, i.e., maintaining it in level flight on course.

As a result, pilots, particularly in solo aircraft, have been unable to make adequate in-flight calculations and, instead, have relied on estimates based on preflight information and information which is readily available without the necessity of making calculations in flight. Resultantly, pilots have often tended to conservatively estimate the distance available from the remaining fuel in the aircraft, and maximum safe performance of the aircraft has not been achieved. In some instances, due to lack of information which could have been obtained from in-flight calculations, aircraft have run out of fuel in flight apparently due to faulty estimate of the situation.

Thus, despite the necessity for making in-flight calculations between check points in order to obtain maximum safe performance from aircraft, as well as to estimate arrival time and select alternate destinations and the like, pilots of high performance aircraft have generally been able to make such calculations a relatively small fraction of the time.

Although the invention is especially useful for pilots of high performance aircraft, it also provides a simpler and more convenient method of solving such problems by pilots of relatively slower speed aircraft.

Accordingly, it is an object of the present invention to provide a compact, lightweight calculating device by means of which persons concerned with navigation may rapidly and easily solve problems and obtain information necessary in navigating and operating various craft and particularly aircraft.

A further object is the provision of a disk type calculator having an appropriate number of disks for determining information of which a pilot must be substantially constantly apprised during a trip, said disks being so constructed and arranged that such information may be obtained from a single setting thereof.

A further object is to provide a multi-disk calculator in which increased frictional means is provided between two of the disks in order to facilitate shifting a third disk relative thereto without disturbing the relative position between the two.

A further object is to provide a disk calculator having aligning means with a minimum of structure above the disks in order to avoid interference with the manipulation of the disks.

Figure 2:
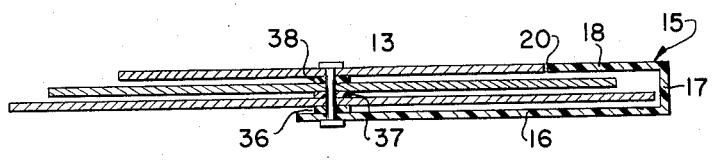

These and other objects of the invention will become apparent from the following description in conjunction with the accompanying drawings, in which:

FIG. 1 is a plan view of a navigational aid in accordance with the invention and showing the relation of the various scales on the various disks; and FIG. 2 is a side elevation showing the relation of the disks, the friction means, and the aligning means.

Briefly stated, the navigational aid of the present invention includes three concentric rotatable disks of large, intermediate and small diameter and arranged in stepped relationship. The inner and outer disks have logarithmic scales on which "fuel" and "distance" indications appear and the intermediate disk has inner and outer logarithmic scales on which "time" indications appear. The fuel and distance indicia are subdivided decimally in a conventional manner, each reading from 10 to 100. The outer time scale on the intermediate disk has its origin indicated at :06 minutes coincident with 60 minutes and subdivided decimally, whereby clock time indicia may be conveniently used. The adjacent inner scale has its 1 and 10 origins opposite the :06 and :60 origins of the outer scale and has its integers subdivided by units of 60 in order to facilitate use of such scale with conventional clock time readings.

In order to facilitate the use of the device, the resistance to relative rotation between the large and intermediate disks is made greater than that between the intermediate and small disks and between the indicator and the large disk. The indicator or aligning device is rotatably mounted on the shaft which supports the disks and has a portion extending over the scales of the large and intermediate disks and adjacent to the small disk.

With further reference to the drawing, there is illustrated a three-disk computer having an outer relatively large disk 10, an intermediate disk 11 and an inner relatively small disk 12. The disks are arranged in stepped relation and rotatably mounted on shaft 13. An aligning member or indicator 15 has its main portion 16 mounted on shaft 13 beneath the outer disk 10 and has a web portion 17 and an indicator arm 18 which overlies the outer rims of the disks 10 and 11 and has its extremity or pointer 20 adjacent to and substantially coplanar with the inner disk 12.

The periphery of the outer disk 10 has a base ten logarithmic scale indication 22 with numerals indicating a range of 10 to 100 and subdivided decimally or in 10ths and has the designation "Distance" appropriately positioned. Similarly, the inner disk 12 has a logarithmic scale with indicia 24 indicating a range of 10 to 100 and divided decimally and with a designation "Fuel." At the origin or 10–100 indicia there is an indicator 26 and the legend "Read miles per gallon (or lb.) on outer scale."

The intermediate disk has inner and outer logarithmic scales 30, 31. The inner scale has indicia indicating a range from 1 to 10 and subdivided into units of 60 intermediate the integers, thus facilitating direct usage of ordinary clock time units. The outer scale of the intermediate disk has indicia 34 indicating a range of :06 to :60, the origin being disposed opposite the 1–10 origin of the inner scale. The outer scale is divided decimally so that fractions of minutes can be read to the nearest 10th.

The intermediate disk has an appropriately positioned "Time" designation and the designation "Fuel Consumption," with an arrow 36 pointing to the fuel scale indicia 24; adjacent to the designation "Fuel Consumption" is the designation "Ground Speed," with an arrow 38 pointing to the scale 22 on the disk 10.

In order to facilitate manipulation of the disks and indicator and to maintain them in proper spaced relation, washers 36, 37 and 38 are provided intermediate the indicator arm and lower disk, the lower and intermediate disks and the intermediate and upper disks, respectively. Desirably, the washer 37 between the lower and intermediate disks provides greater resistance between disks 10 and 11 than between disks 11 and 12 and between disk 10 and arm 15. In order to accomplish this, the washer 37 may be of a frictional substance, such as relatively soft rubber, and the other washers of a relatively smoother substance such as plastic or other sheet material.

Due to the relation of the scales on the disks, and the facilitation of accurate coordination, the calculator is relatively simple and easy to use, and unknown variables encountered in air and other types of navigation may be more easily solved.

A comparison of the actual steps involved in solving a hypothetical problem using a two-disk calculator of the prior art and using applicant's calculator is as follows:

Assuming that it is known:
 (a) distance from the last check point to the present position is 369 miles;
 (b) it has required 49 minutes to reach;
 (c) a fuel consumption of 170 gallons;
 (d) the distance to the next check point is 109 miles;
 (e) to the destination is 500 miles;
 (f) 379 gallons of fuel remain.

Operation of applicant's three-disk computer is as follows:
 (1) Align the three disks, using the alignment member, with 369 miles on the distance scale, 49 minutes on the time scale and 170 gallons on the fuel scale;
 (2) opposite 109 miles on the distance scale, read 14 minutes time required to reach the next check point; opposite 500 miles on the distance scale, read 1:07 hours and minutes required to reach destination and on the fuel scale, read 233 gallons required to reach destination;
 (3) opposite 379 gallons on the fuel scale, read 821 miles that can be flown from the present position and in 1:49 hours and minutes;
 (4) opposite the ground speed arrow indicator, read 452 knots (nautical miles per hour) ground speed of the aircraft;
 (5) opposite the fuel consumption indicator, read 209 gallons per hour;
 (6) opposite the miles per gallon indicator, read 2.16 miles per gallon.

Using applicant's three-disk computer, the three disks are set in a single position from which all seven unknowns were read.

In addition, the transition from solving one problem using applicant's device is greatly simplified, since usually only slight movement of the disks is required to set the same for the next succeeding problem on a flight after the initial setting.

In order to assist in setting the device applicant's has friction means between certain of the disks to reduce the likelihood of inadvertent relative motion therebetween and to assist in holding a pair of disks in adjusted position while the third and the indicator are being set.

The foregoing is merely illustrative of the problems which may be solved and is not intended to indicate all possible uses of the invention.

Accordingly, it will be apparent that the invention includes three stepped superposed disks or other concentric alignable means with logarithmic scales, the outer disk having distance markings, the outer scale of the intermediate disk having time markings from :06 to :60 and subdivided into units of 10ths, the inner scale of the intermediate disk having time markings from 1:0 to 10:0 and subdivided into units of 60 minutes and the scale of the inner disk reading from 10 to 100 and divided into 10ths, said intermediate scale having an indicator at its :06 point and at its 1:0 point, whereby the ground speed may be read on the outer disk opposite the :06 index of the intermediate disk and whereby the gallons per hour may be read on the outer disk opposite the index of said inner disk.

It will be obvious to those skilled in the art that various changes may be made in the described embodiment of the invention without departing from the spirit and scope thereof, and therefore the invention is not limited by that which is illustrated in the drawing and described in the specification, but only as indicated in the accompanying claims.

What is claimed is:

1. A navigational computer comprising three disks concentrically superposed in step relationship, each of said disks being mounted for movement relative to the others,
    (a) a logarithmic scale on the outer periphery of the outermost disk with units corresponding to distance,
    (b) two logarithmic scales corresponding to time on the intermediate disk, each extending about the full circumference of the disk, one being radially spaced inwardly from the other, the outermost having units from :06 to :60 with intermediate divisons of tenths, the innermost having units from 1:0 to 10 with intermediate graduations of sixtieths, the :06 of the outermost and the 1:0 of the innermost being in radial alignment, a ground speed indicator marked at the origin of the outermost scale, a fuel consumption indicator marked at the origin of the innermost scale,
    (c) a logarithmic scale on the outer periphery of the innermost disk with units corresponding to fuel,
    (d) friction means between the outermost and the intermediate disk and anti-friction means between the innermost and the intermediate disk thus permitting the innermost disk to be rotated without rotating the intermediate and outermost disk, and
    (e) a centrally mounted alignment means having a radially extending indicator whereby all disks can be easily brought into radial alignment and readings can be easily made from units on any of the scales in radial alignment with units on the other of the scales.

2. A navigational computer comprising three members mounted together for movement relative to each other,
    (a) a logarithmic scale on an outermost member with units corresponding to distance,
    (b) two logarithmic scales corresponding to time on the intermediate member, each spread through substantially the full extent of the member, one being aligned with and spaced from the other, one scale having units from :06 to :60 with intermediate divisions of tenths, the other scale having units from 1:00 to 10:00 with intermediate graduations of sixtieths, the :06 of the outermost and the 1:00 of the innermost being in alignment, a ground speed indicator marked at the origin of the scale closest the member carrying the distance units scale, a fuel consumption indicator marked at the origin of the scale closest the other member, and
    (c) a logarithmic scale on the other outer member with units corresponding to fuel.

3. A navigational computer comprising three disks concentrically superposed in step relationship, each of said disks being mounted for movement relative to the others,
    (a) a logarithmic scale on the outer periphery of the outermost disk with units corresponding to distance,
    (b) two logarithmic scales corresponding to time on the intermediate disk, each extending about the full circumference of the disk, one being radially spaced inwardly from the other, the outermost having units from :06 to :60 with intermediate divisions of tenths, the innermost having units from 1:00 to 10:00 with intermediate graduations of sixtieths, the :06 of the outermost and the 1:00 of the innermost being in radial alignment, a ground speed indicator marked at the origin of the outermost scale, a fuel consumption indicator marked at the origin of the innermost scale,
    (c) a logarithmic scale on the outer periphery of the innermost disk with units corresponding to fuel, and
    (d) friction means between the outermost and the intermediate disk and anti-friction means between the innermost and the intermediate disk thus permitting the innermost disk to be rotated without rotating the intermediate and outermost disk.

4. A navigational computer comprising three disks concentrically superposed in step relationship, each of said disks being mounted for movement relative to the others,
    (a) a logarithmic scale on the outer periphery of the outermost disk with units corresponding to distance,
    (b) two logarithmic scales corresponding to time on the intermediate disk, each extending about the full circumference of the disk, one being radially spaced inwardly from the other, the outermost having units from :06 to :60 with intermediate divisions of tenths, the innermost having units from 1:00 to 10:00 with intermediate graduations of sixtieths, the :06 of the outermost and the 1:00 of the innermost being in radial alignment, a ground speed indicator marked at the origin of the outermost scale, a fuel consumption indicator marked at the origin of the innermost scale, and
    (c) a logarithmic scale on the outer periphery of the innermost disk with units corresponding to fuel.

References Cited by the Examiner

UNITED STATES PATENTS

| | | | |
|---|---|---|---|
| 736,481 | 8/1903 | Betts | 235—84 |
| 2,404,709 | 7/1946 | Hill | 235—78 |
| 2,418,933 | 4/1947 | Hill | 235—78 |
| 2,423,822 | 7/1947 | Averbach | 235—78 |
| 2,437,621 | 3/1948 | Strate | 235—78 |
| 2,506,299 | 5/1950 | Isom | 235—61.02 |
| 2,996,246 | 8/1961 | Swanson | 235—83 |
| 3,086,703 | 4/1963 | Germack | 235—78 X |

FOREIGN PATENTS 382,589  10/1932  Great Britain.

LEO SMILOW, *Primary Examiner.*

C. G. COVELL, *Assistant Examiner.*